(12) United States Patent
Chang (10) Patent No.: US 8,915,179 B2
(45) Date of Patent: Dec. 23, 2014

(54) MUFFIN BAKER

(75) Inventor: Shuhui Chang, Kaohsiung (TW)

(73) Assignee: Tsann Kuen(China) Enterprise Co., Ltd, Xiamen (CN)

( * ) Notice: Subject to any disclaimer, the term of this patent is extended or adjusted under 35 U.S.C. 154(b) by 1510 days.

(21) Appl. No.: 12/668,909

(22) PCT Filed: Nov. 2, 2007

(86) PCT No.: PCT/CN2007/003113
§ 371 (c)(1),
(2), (4) Date: Apr. 8, 2010

(87) PCT Pub. No.: WO2008/052442
PCT Pub. Date: May 8, 2008

(65) Prior Publication Data
US 2010/0199858 A1    Aug. 12, 2010

(30) Foreign Application Priority Data
Nov. 3, 2006   (CN) .......................... 2006 1 0069596

(51) Int. Cl.
*A22C 7/00*    (2006.01)
*H05B 3/68*    (2006.01)
*A47J 37/06*   (2006.01)

(52) U.S. Cl.
CPC .................................. *A47J 37/0611* (2013.01)
USPC .................. 99/427; 99/372; 99/424; 99/339; 99/400; 99/444; 219/450.1; 219/386; 219/403; 219/406; 219/530

(58) Field of Classification Search
CPC .................................................... A47J 37/0611
USPC ........... 99/424, 326–334, 339, 337, 340, 344, 99/372–384, 385, 389–391, 400, 401, 99/444–446; 219/450.1, 386, 403, 406, 219/430, 433–434, 436, 451.1, 452.11, 219/452.13, 455.11, 530, 533
See application file for complete search history.

(56) References Cited

U.S. PATENT DOCUMENTS

| | | | |
|---|---|---|---|
| 2,962,019 A * | 11/1960 | Lundgren | 126/25 R |
| 3,182,585 A * | 5/1965 | Rensch et al. | 99/340 |
| 3,593,648 A * | 7/1971 | Walters | 99/349 |
| 3,611,912 A * | 10/1971 | Choc | 99/340 |
| 4,325,294 A * | 4/1982 | Hammond | 99/337 |
| 4,803,918 A | 2/1989 | Carbon et al. | |
| 5,450,785 A | 9/1995 | Westbrooks | |
| 5,937,742 A | 8/1999 | Steeb et al. | |
| 6,167,796 B1 | 1/2001 | Wright et al. | |
| 6,272,978 B1 | 8/2001 | Westbrooks | |

(Continued)

FOREIGN PATENT DOCUMENTS

JP        07-047034 A     2/1995

*Primary Examiner* — Dana Ross
*Assistant Examiner* — Ket D Dang
(74) *Attorney, Agent, or Firm* — Rabin & Berdo, P.C.

(57) ABSTRACT

A muffin maker comprises a support device, a main body and a collecting plate. A pedestal of the support device includes a first inserted portion. Two support arms of the support device include a rotary device. The main body is used for baking muffin and is connected to the rotary device. The collecting plate is mounted on the pedestal of the support device and includes a second inserted portion. The second inserted portion is connected with the first inserted portion and the normal line of the collecting plate is perpendicular to the normal line of the pedestal.

7 Claims, 11 Drawing Sheets

(56) References Cited

U.S. PATENT DOCUMENTS

| | | |
|---|---|---|
| 7,021,199 B2 * | 4/2006 | Lubowicki et al. ............. 99/372 |
| 2004/0123744 A1 * | 7/2004 | Bobo ............................. 99/374 |
| 2005/0039737 A1 * | 2/2005 | Haber ............................ 126/30 |
| 2006/0049165 A1 | 3/2006 | Li |
| 2006/0049169 A1 * | 3/2006 | Li ............................. 219/450.1 |

* cited by examiner

MUFFIN BAKER

FIELD OF THE INVENTION

The present invention relates to a muffin maker, especially relates to a muffin maker having an inserted structure which could store a collecting plate.

BACKGROUND OF THE INVENTION

Muffin maker which is used for baking muffin has been widely used in families. Please refer to FIG. 1A, FIG. 1B and FIG. 1C, which are respectively a three-dimension view, a top view and a side view of the conventional muffin maker (100). The conventional muffin maker (100) comprises a support device (110), a main body (220), a collecting plate (130) and a handle (140). The support device (110) comprises a pedestal (112) and two support arms (114). The main body (120) comprises an upper shell (122), an upper baking plate (124), a lower shell (126) and a lower baking plate (128). With a rotary device (150) and a rotating shaft (160), the main body (120) is supported by the support arms (114). A pivot component (115) in the rotary device is used to make the upper shell (122) and the lower shell (126) move between opening position and closing position. When the upper shell (122) and the lower shell (126) are in the opening position, the upper baking plate (124) and the lower baking plate (128) are exposed and muffin ingredients could be put into the lower baking plate (128). The rotating shaft (160) consists of an upper part (160a) and a lower part (160b), which are respectively connected to the upper shell (122) and the lower shell (126), and the two parts could be divided. Besides, a electric heating pipe (122a) in the upper shell (122) and another one (126a) in the lower shell (126) are used to respectively heat the upper baking plate (124) and the lower baking plate (128). A button of controlling temperature (123) laid out on the upper shell (122) is used for adjusting temperature. The handle (140) is fixed to the upper part (160a) of the rotating shaft (160) so that the main body (120) could be turned to rotate by hand.

Figure 1A:
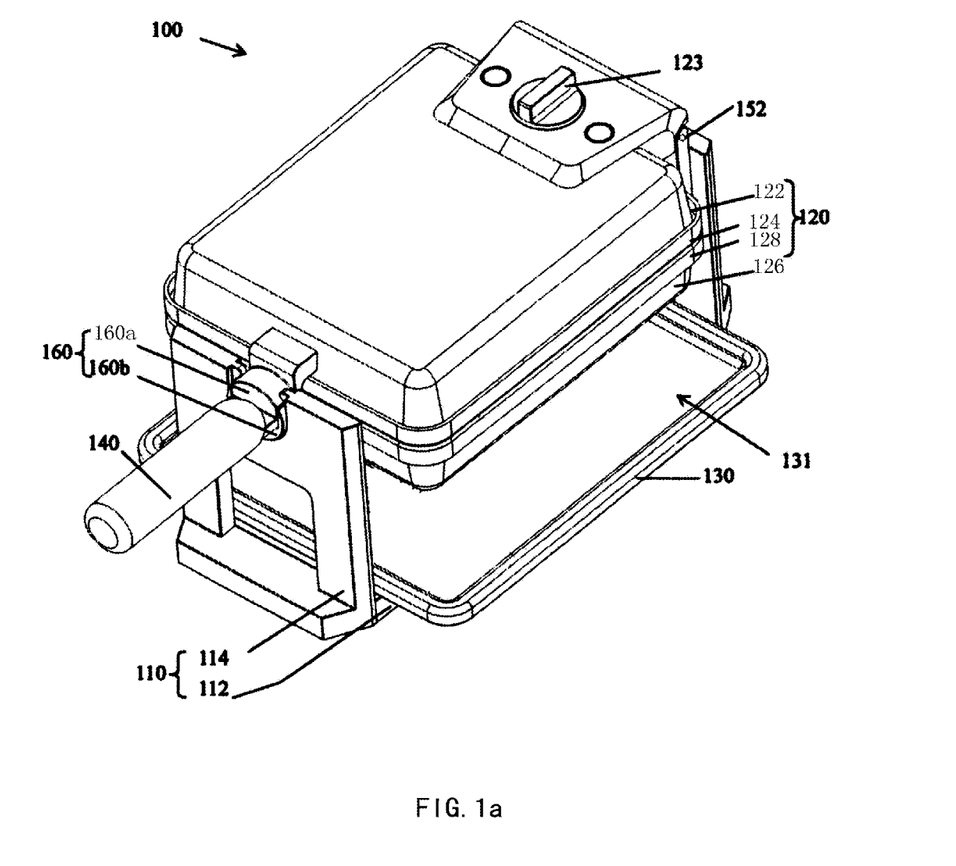
FIG. 1A is a three-dimension view of the muffin maker.
Figure 1B:
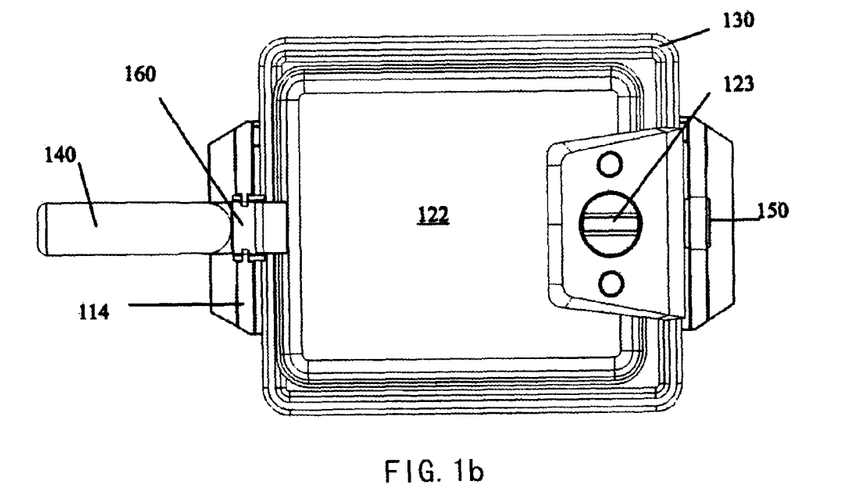
FIG. 1B is a top view of the muffin maker.
Figure 1C:
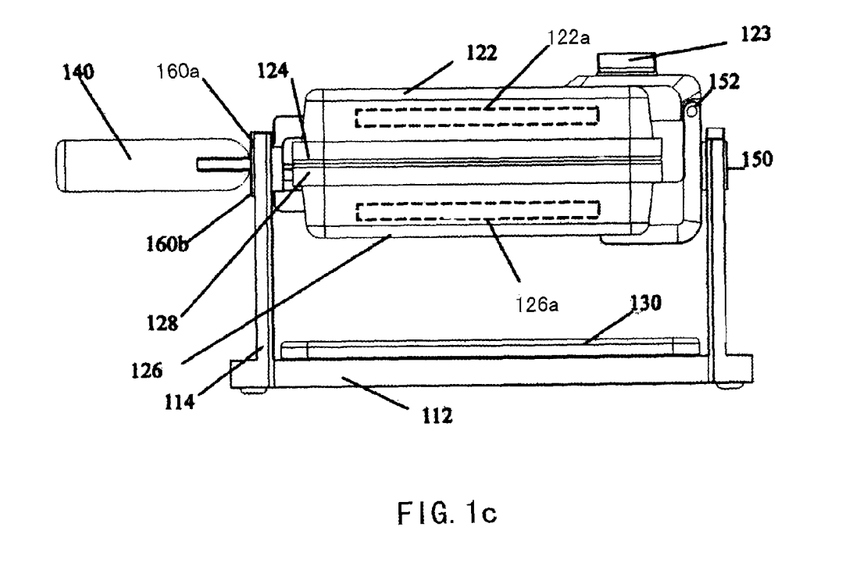
FIG. 1C is a side view of the muffin maker.

In the conventional muffin maker (100), in order to avoid the problem of the ingredients falling from the lower baking plate (128) to the table or the pedestal, the collecting plate (130) is set up on the pedestal (112) to collect all the fallen ingredients. However, owing to the large load-bearing surface of the collecting plate (130), after the muffin maker completes its work, the collecting plate (130) takes up too much room and it is possible to lose the collecting plate (130) for storing it separately. So it is inconvenient for users to store the collecting plate (130).

SUMMARY OF THE INVENTION

The main purpose of the present invention is to overcome the shortages of the inconvenience of storing the muffin maker and its taking up too much room.

On the one hand, the present invention supplies a muffin maker having an inserted device between the support device and the collecting plate or between the main body and the collecting plate. After the muffin maker completes its work, the inserted device is used to insert the collecting plate in the support device or the main body, and the normal line of the collecting plate is perpendicular to the normal line of the pedestal of the support device. So the present invention overcomes the drawback that the muffin maker takes up too much room when it is kept in storage.

On the other hand, in the present invention, the present invention supplies a muffin maker having two inserted devices between the support device and the collecting plate or between the main body and the collecting plate. So when the muffin maker is working, the collecting plate could be inserted in the pedestal in order to locate the collecting plate and stabilize the muffin maker. Besides after the muffin maker completes its work, the collecting plate could be inserted in the main body or the support device and the normal line of the collecting plate is perpendicular to the normal line of the pedestal, so that the drawback of the inconvenience of storing the muffin maker is overcome.

In a preferred embodiment of the present invention, the muffin maker comprises a support device, a main body and a collecting plate. The support device includes a first inserted portion, and the support arms of the support device have a rotary device. The main body, which is used for baking muffin, is connected to the rotary device. The collecting plate is set up on the support device, and it includes a second inserted portion when the main body is kept in storage, second inserted portion is connected with the first inserted portion and the normal line of the collecting plate is perpendicular to the normal line of the pedestal.

In a preferred embodiment of the present invention, the muffin maker comprises a support device, a main body and a collecting plate. The support device comprises a pedestal and two support arms which have a rotary device. The main body, having a first inserted portion, is used for baking muffin and is connected to the rotary device. The collecting plate, which is set up on the main body, includes a second inserted portion connected with the first inserted portion, so that the normal line of the collecting plate could be perpendicular to the normal line of the pedestal.

In a preferred embodiment of the present invention, the muffin maker comprises a support device, a main body and a collecting plate. The pedestal of the support device includes a first inserted portion and a second inserted portion, and the first inserted portion is between the second inserted portion and the side of the pedestal. The support arms of the support device have a rotary device. The main body which is used for baking muffin is connected to the rotary device. The collecting plate, which is set up on the pedestal of the support device, includes a third inserted portion and a forth inserted portion, and the third inserted portion is on the side surface of the collecting plate. When the main body is working, the forth inserted portion of the collecting plate is connected with the second inserted portion of the support device; when the main body is kept in storage, the third inserted portion of the collecting plate is connected with the first inserted portion.

In a preferred embodiment of the present invention, the said first inserted portion could be a groove or a protuberance.

In a preferred embodiment of the present invention, the said second inserted portion could be a side or a hollow of the collecting plate.

In the said muffin maker, the collecting plate is inserted into the support device or the main body, and the normal lines of the bottom of the collecting plate and the shell of the main body of the muffin maker are both perpendicular to the normal line of the pedestal. So the problem that the conventional muffin maker takes up too much room could be solved. Besides, another inserted device could be set up in the pedestal of the present invention so that the collecting plate is inserted in another inserted device in order to locate the collecting plate and stabilize the muffin maker, when the muffin maker is working. So compared to the conventional muffin maker, the present invention is simple and easy to volume-production, and under different working conditions, the collecting plate is in different positions, so that the problems of the storage and the location of the collecting plate could be improved.

DESCRIPTION OF MARKS IN THE DRAWINGS

100—muffin maker; 110—support device; 112—pedestal; 114—support arms; 120—main body (baking device); 122—upper shell; 122a—electric heating pipe; 123—button of controlling temperature; 124—upper baking plate; 126—lower shell; 126a—electric heating pipe; 128—lower baking plate; 130—collecting plate; 131—load—bearing surface; 140—handle; 150—rotary device; 152—pivot component; 160—rotating shaft; 160a—upper part; 160b—lower part; 200—muffin maker; 202—pivot axis; 210—support device; 211—top surface; 212—pedestal; 212a—first inserted portion; 212b—second inserted portion; 213—normal line; 214—support arms; 214a—fifth inserted portion; 215—normal line; 220—main body; 221—normal line; 222—upper shell; 222a—electric heating pipe; 223—button of controlling temperature; 224—upper baking plate; 224a—lattice pattern; 226—lower shell; 226a—electric heating pipe; 227—seventh inserted portion; 228—lower baking plate; 228a—lattice pattern; 230—collecting plate; 230a—third inserted portion; 230b—forth inserted portion; 230c—sixth inserted portion; 231—normal line; 233—pedestal; 240—handle; 240a—hinge; 242—upper handle; 244—lower handle; 250—rotary device; 252—rotary fixing component; 254—pivot component; 260—rotating shaft; 260a—upper part; 260b—lower part.

DESCRIPTION OF SPECIFIC EMBODIMENTS

Referring to FIG. 2A, FIG. 2B, FIG. 2C, FIG. 2D, FIG. 2E and FIG. 2F, the muffin maker 210 comprises a support device 210, a main body 220, a collecting plate 230 and a handle 240.

Figure 2A:
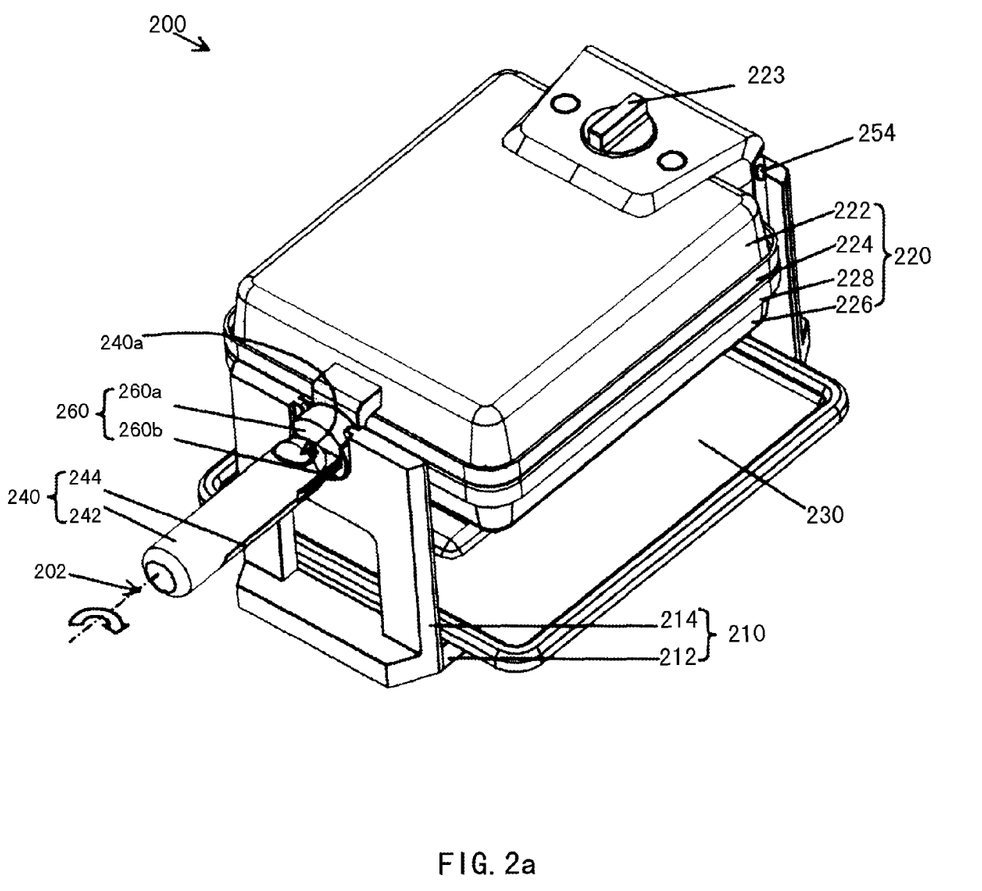
FIG. 2A is a three-dimension view of the muffin maker in a preferred embodiment, when it is working.
Figure 2B:
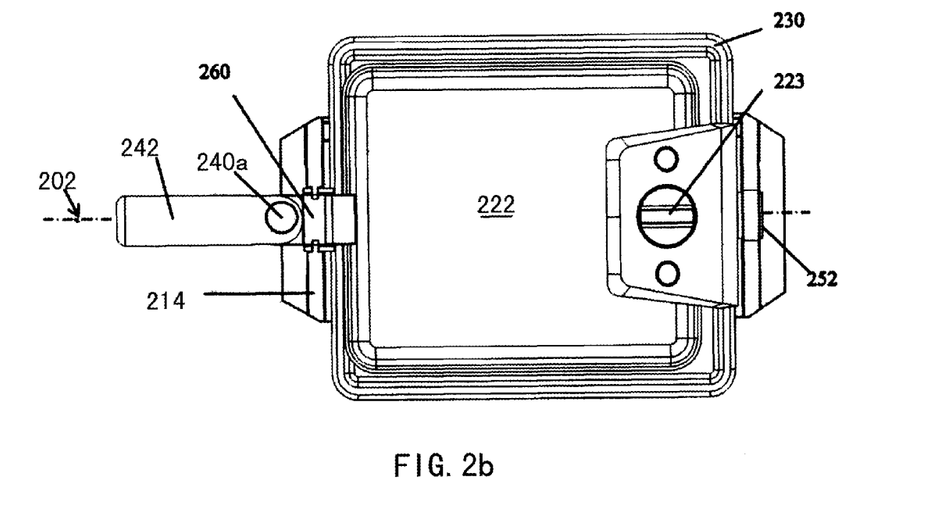
FIG. 2B is a top view of the muffin maker in a preferred embodiment, when it is working.
Figure 2C:
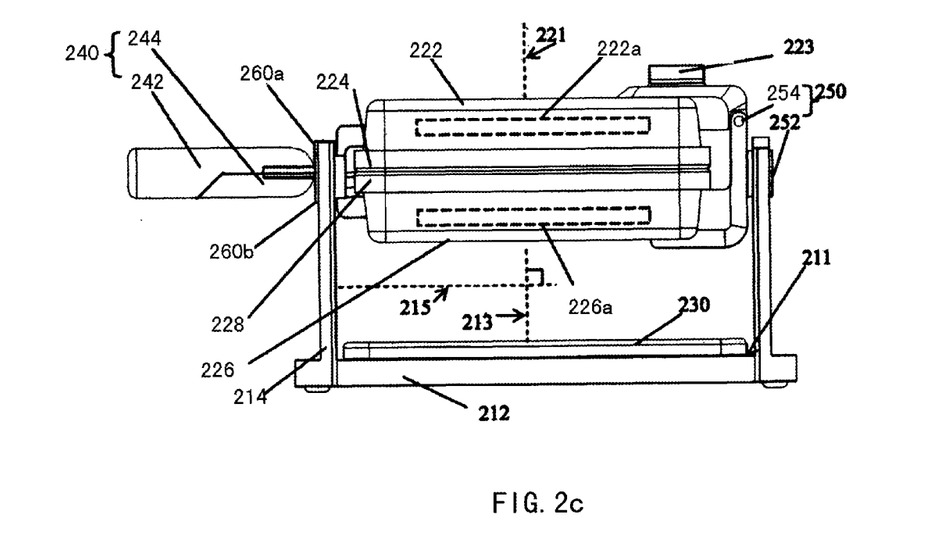
FIG. 2C is a side view of the muffin maker in a preferred embodiment, when it is working.

In the embodiment, the support device 210 comprises a pedestal 212 and two support arms 214, and the pedestal 212 that is set up between the two support arms 214 which are in relative positions is connected to these support arms 214. However, the present invention is not limited in the embodiment, these support arms 214 could also be set up in the top surface 211 of the pedestal 212, as long as the normal line 215 of the support arms 214 is perpendicular to the normal line 213 of the pedestal 212. The main body 220 comprises an upper shell 222, an upper baking plate 224, a lower shell 226 and a lower baking plate 228. The upper baking plate 224 and a lower baking plate 228 are respectively connected to the upper shell 222 and the lower shell 226, which are both between these shells 222, 226. A heating device (for example electric heating pipes 222a, 226a) is set up in the upper shell 222 and the lower shell 226 in order to heat the upper baking plate 224 and a lower baking plate 228. Furthermore, these baking plates 224, 228 respectively have an inserted portion (for example a hole), while these shells 222, 226 respectively have a second inserted portion (for example a claw). The second inserted portion is connected with the first inserted portion so that these baking plates 224, 228, which could be separated from each other, could be respectively connected to the upper shell 222 and the lower shell 226. In the embodiment, these electric heating pipes 222a, 226a are respectively between these shells 222, 226 and these baking plates 224, 228 which have lattice patterns 224a, 228a(referring to FIG. 2G). Besides, a button 223 of controlling temperature, which is set up in the upper shell 222, is used to set heating temperature. However, the present invention is not limited in the embodiment, the button 223 of controlling temperature could also be set up in the support device 210 or other positions. The main body 220 is used for baking muffin, and is connected to the rotary device 250 which is set up in the support arms 214.

In the embodiment, with the rotary device 250 and the rotating shaft 260, the main body 220 is supported by the two support arms. The rotary device 250 comprises a rotary fixing component 252 in the support arms 214 and a pivot component 254 in the rotary fixing component 252. The pivot component 254 is used to make the upper shell 222 and the lower shell 226 move between opening position and closing position. When the upper shell 222 and the lower shell 226 are in opening position, the upper baking plate 224 and the lower baking plate 228 are exposed and the ingredients could be put into the lower baking plate 228. With the rotary fixing component, the main body 220 is rotating fixed to the support arms 214. The rotating shaft 260 comprises an upper part 260a and a lower part 260b which are connected to the upper shell 222 and the lower shell 226 respectively. Besides, the two parts 260a, 260b can be separated from each other.

The handle 240, which is fixed to the rotating shaft 260, is used to turn the main body 220 to rotate. In the embodiment, after the muffin maker 200 completes its work, the handle 240 is turned to rotate about 90 degrees around the pivot axis 202 in order to make the normal line 221 of the main body perpendicular to the normal line 213 of the pedestal 212. Besides the handle 240 could rotate about 90 degrees around the hinge 240a so that the handle 240 could be close to the support arm 214. In the embodiment, the handle 240 comprises an upper handle 242 rotating fixed to the upper part 260a and a lower handle 244 rotating fixed to the lower baking plate 228. However, the present invention is not limited in the embodiment, referring to FIG. 2G, without the rotating shaft 260, the handle 240 could also be fixed to the main body 220. It is worth mentioning that owing to the lower handle 244 rotating fixed to the lower baking plate 228, users could pour the muffin into dinner plate with the lower handle 244. Moreover, a button could be set up in the hinge 240a. After the muffin maker 200 completes its work, only if the hinge 240a is pressed, the handle could rotate relative to the hinge 240a. In the embodiment, for the convenience of baking muffin, a rotation limit device is set up on the support arm 214 and the rotary device 250 in order to limit the range of rotation angle of the main body 220 in 180 degrees. In the embodiment, the rotation limit device comprises a convex column laid out on the rotary device 250 and a semi-circular groove laid out on the support arm 214. The convex column is assembled in the semi-circular groove in order to limit the range of rotation angle of the main body 220 in 180 degrees. However, the present invention is not limited in the embodiment. The rotation limit device could also be set up on the rotating shaft 260 and the other one of the support arms 214, and the relative position of the convex column and the semi-circular groove is not limited.

Figure 2D:
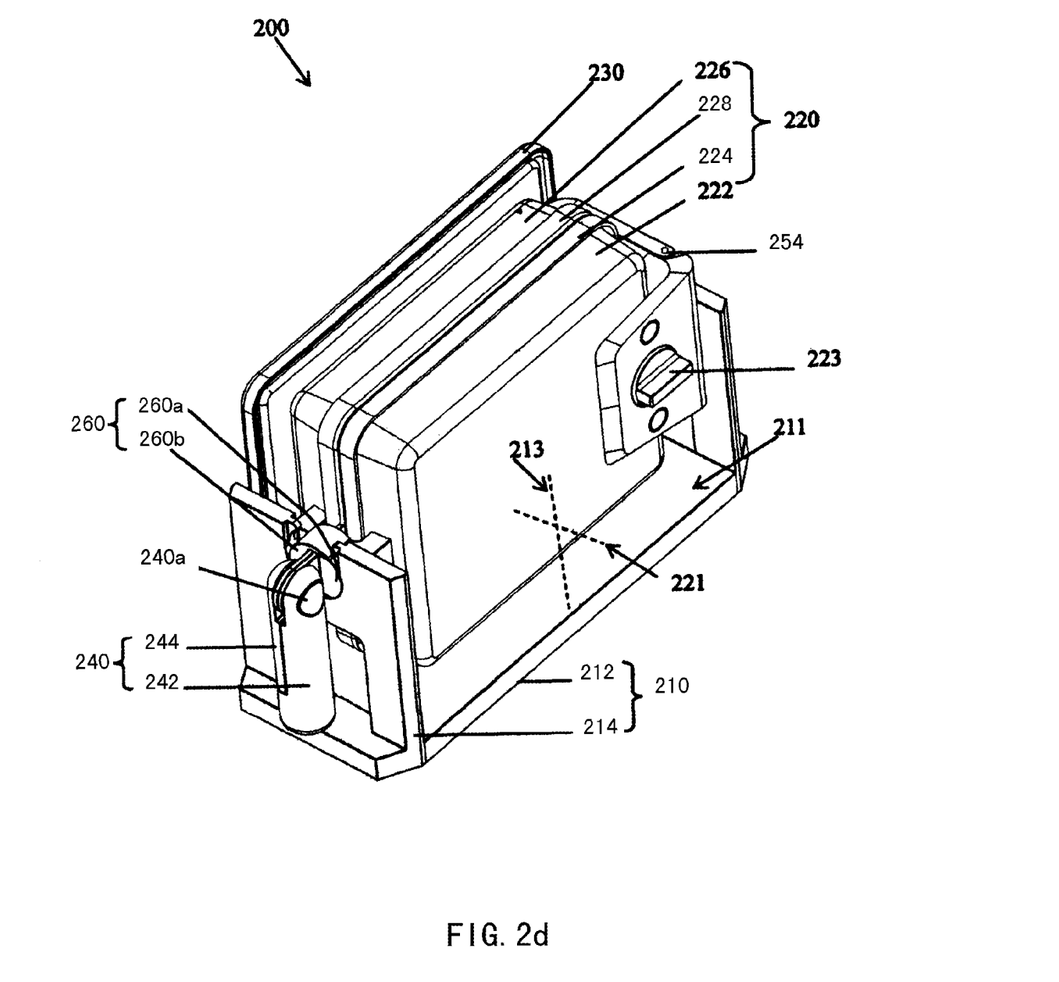
FIG. 2D is a three-dimension view of the muffin maker in FIG. 2A when it is kept in storage
Figure 2E:
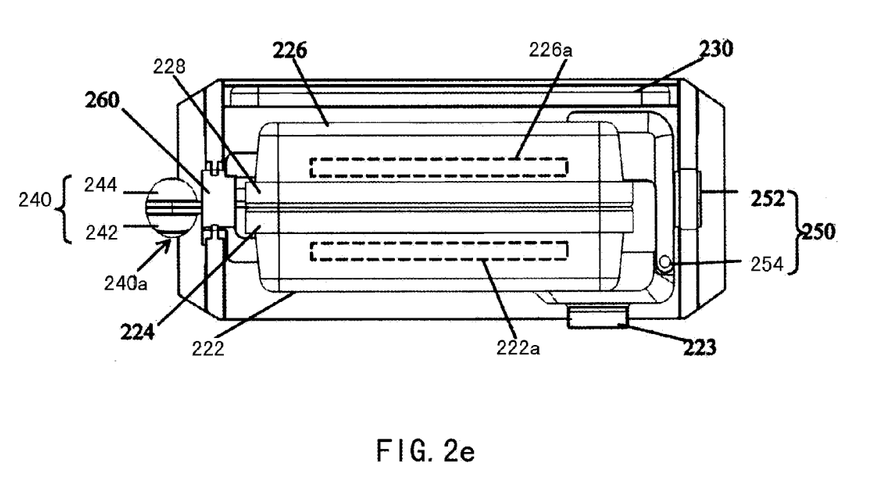
FIG. 2E is a top view of the muffin maker in FIG. 2A when it is kept in storage.
Figure 2F:
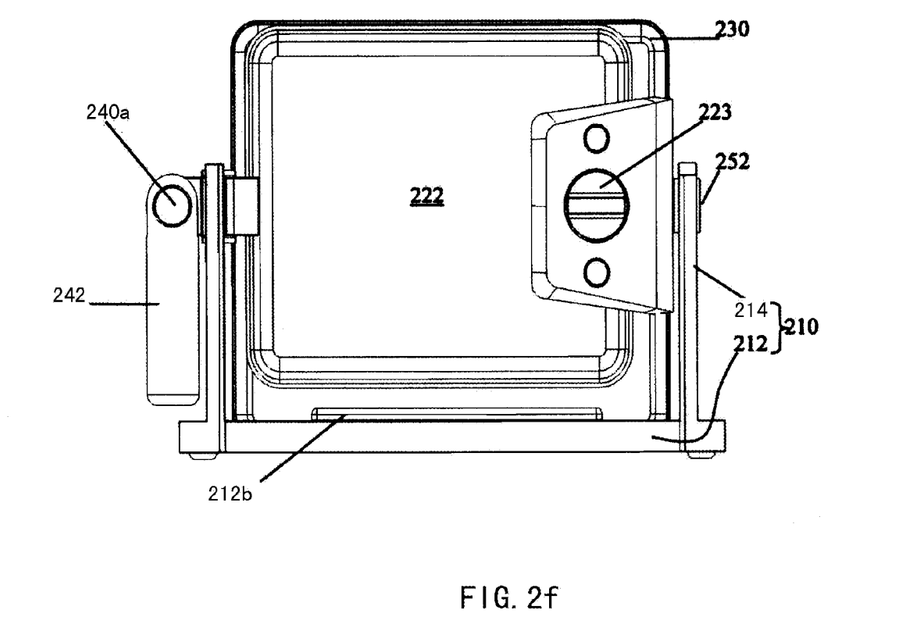
FIG. 2F is a side view of the muffin maker in FIG. 2A when it is kept in storage.
Figure 2G:
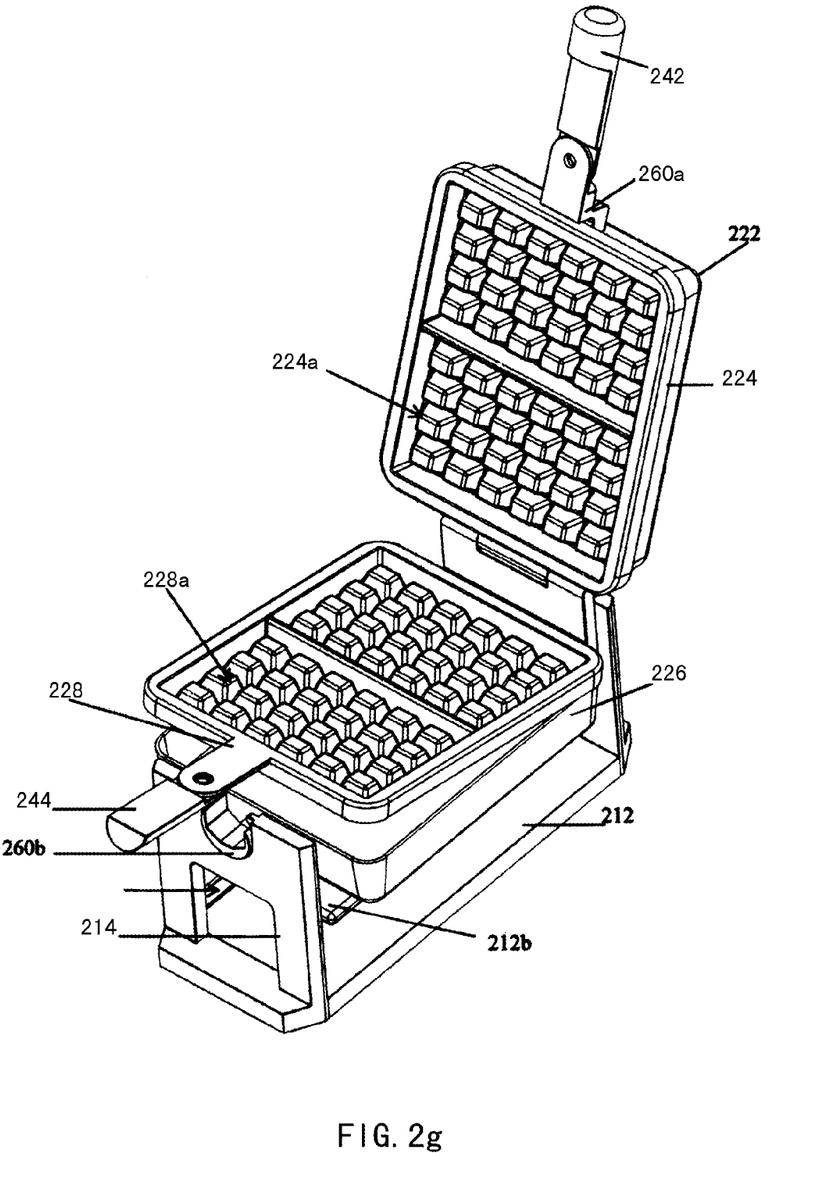
FIG. 2G is a three-dimension view illustrating the positioning relation of the handle and the main body of the muffin maker in FIG. 2A.
Figure 2H:
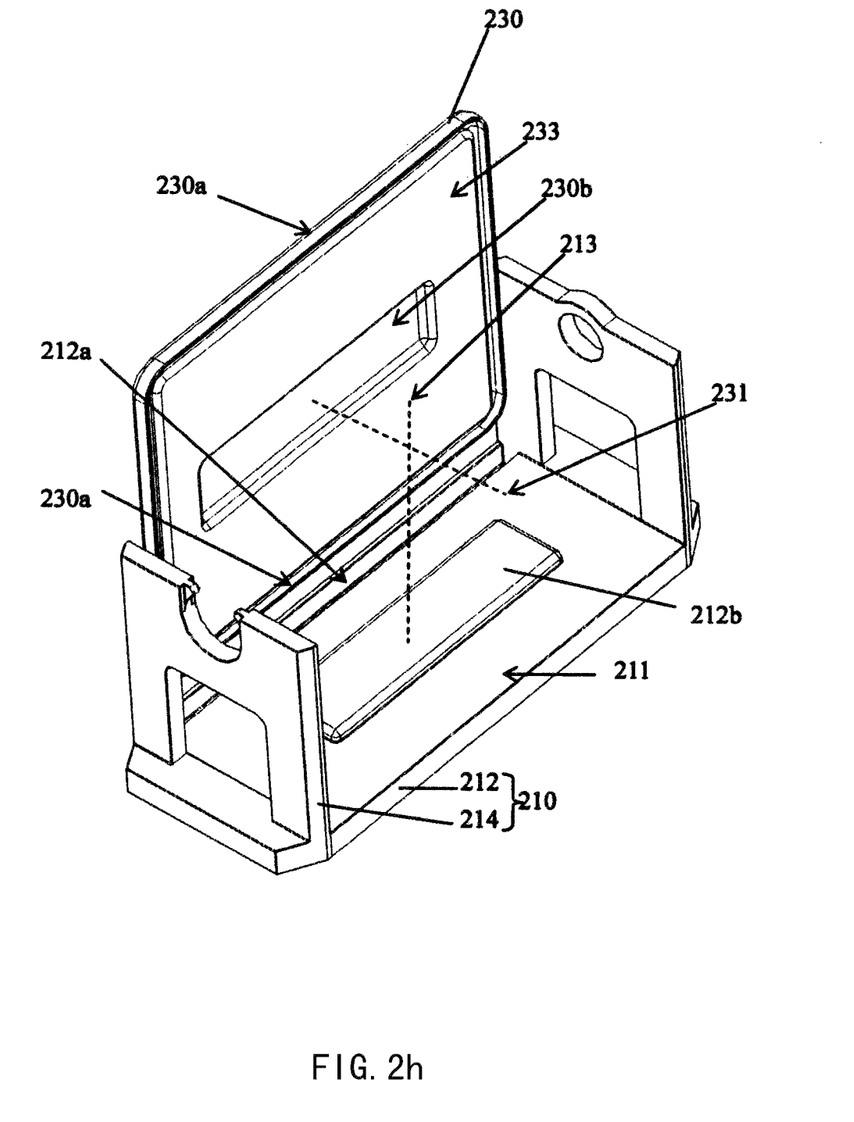
FIG. 2H is a three-dimension view of the collecting plate inserted in the support device in FIG. 2D.

Referring to FIG. 2H and FIG. 2D, the collecting plate 230 is set up on the pedestal 212 of the support device. A first inserted portion 212a and a second inserted portion 212b are laid out on the top surface 211 of the pedestal 212, and the collecting plate 230 includes a third inserted portion 230a and a forth inserted portion 230b. The third inserted portion 230a is on one side surface of the collecting plate 230, and the forth inserted portion is on the bottom 233 of the collecting plate 230. The third inserted portion 230a is connected with the first inserted portion 212a, and the normal line 231 of the collecting plate 230 is perpendicular to the normal line 213 of the pedestal 212. It is worth mentioning that the normal line 231 of the collecting plate 230 is not exactly perpendicular to the normal line 213 of the pedestal 212, but, because of the existence of manufacturing errors during manufacturing these inserted portions 212a, 230a.

In the embodiment, the first inserted portion 212a is a groove near a side surface of the pedestal 212, and the third inserted portion 230a is a surface of the collecting plate 230. However, the present invention is not limited in the embodiment. The first inserted portion 212a could also be a protuberance and the third inserted portion 230a is a hollow in a side surface of the collecting plate 230, as long as the first inserted portion 212a could be connected with the third inserted portion 230a.

Figure 2I:
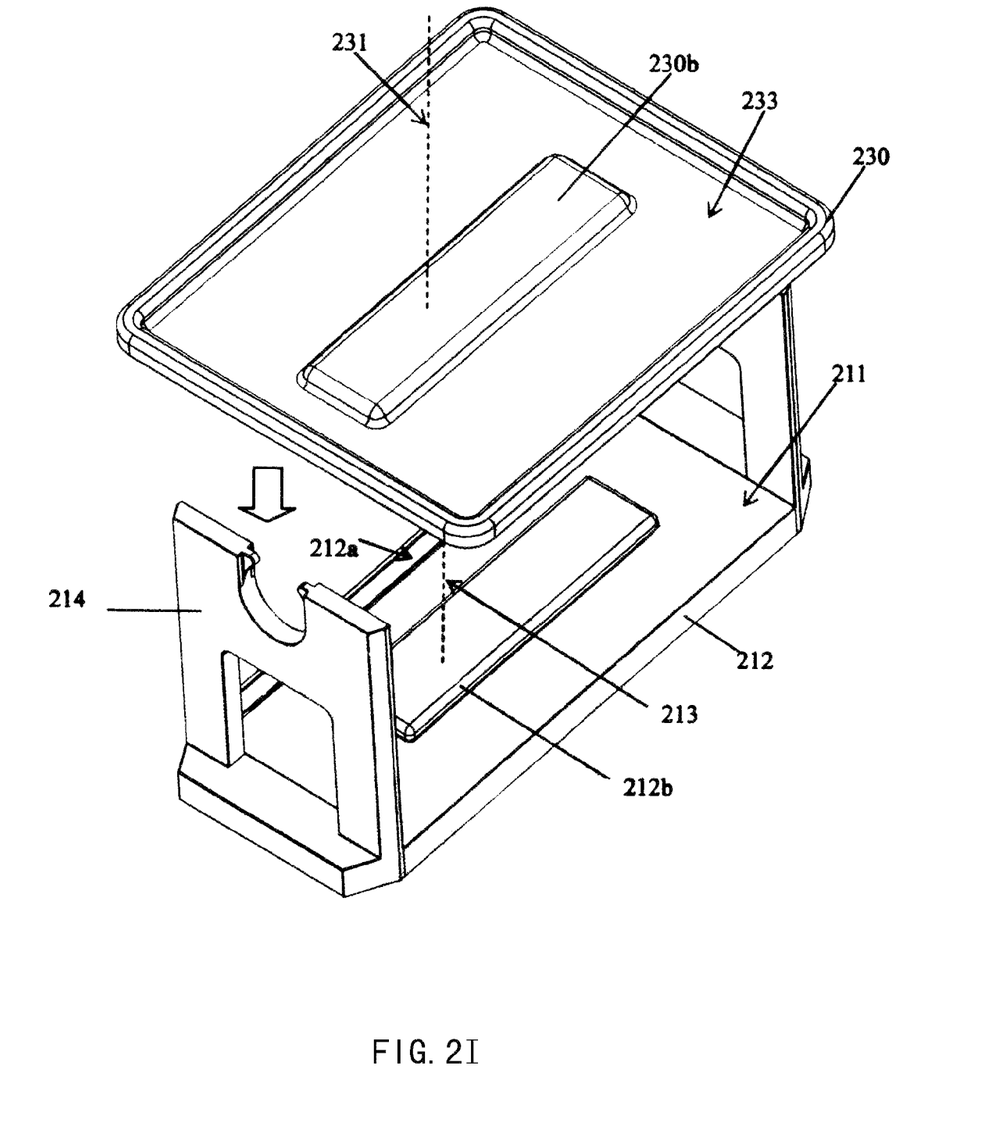
FIG. 2I is a three-dimension view of the collecting plate inserted in the support device in FIG. 2A.

Refereeing to FIG. 2A and FIG. 2I, collecting plate 230 is also set up on the pedestal 212 of the support device 210, but the forth inserted portion 230b is connected with the second inserted portion 212b and the normal line 231 of the collecting plate 230 is parallel or equivalent to the normal line 213 of the pedestal 212. In the embodiment, the second inserted portion 212b is in the middle of the top surface 211 of the pedestal 212, and forth inserted portion 230b is in middle of the bottom 233 of the collecting plate 230, but the present invention is not limited in the embodiment. These inserted portions 212b, 230b could also be set up in other parts of the top surface 211 of the pedestal 212 and the bottom 233 of the collecting plate 230. In the embodiment, the forth inserted portion 230b is a hollow, and the second inserted portion 212b is a protuberance, but the present invention is not limited in the embodiment. The forth inserted portion 230b could also be a protuberance, and the second inserted portion 212b could also be a hollow, as long as the forth inserted portion 230b is connected with the second inserted portion 212b.

Figure 3:
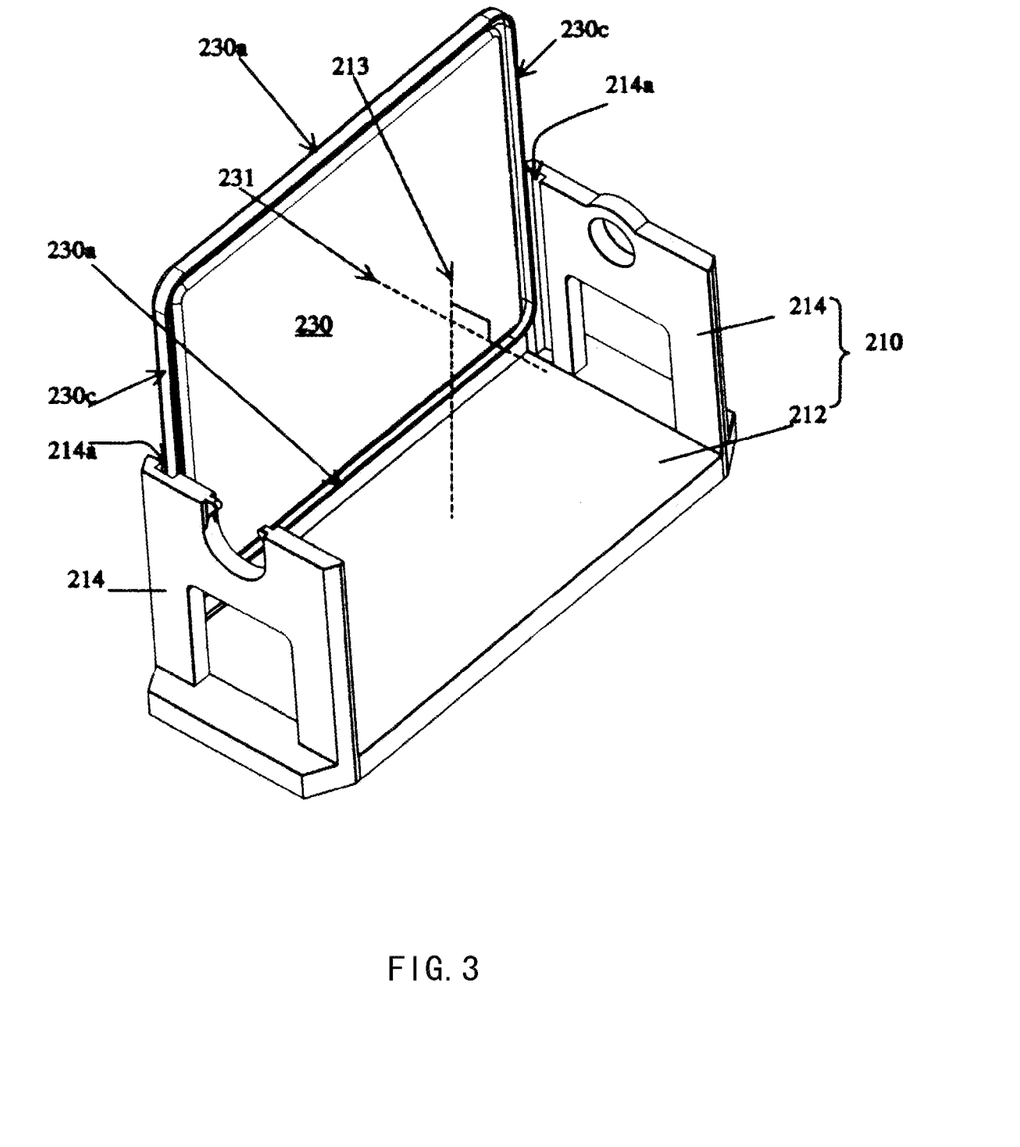
FIG. 3 is a three-dimension view of the collecting plate inserted in the support device in a embodiment of the present invention.

Referring to FIG. 3, in the embodiment, the collecting plate 230 is inserted in the two support arms 214 of the support device 210. In order to make the normal line 231 of the collecting plate 230 perpendicular to the normal line 213 of the pedestal 212, these support arms 214 respectively have a fifth inserted portion 214a connected with the sixth inserted portion 230c of the collecting plate 230. It is worth mentioning that at this time the distance between the two support arms 214 is shorter than the length of the third inserted portion 230a of the collecting plate 230, as long as one of the support arms 214 has the fifth inserted portion 214a, the effect that the collecting plate 230 is inserted and fixed could be achieved. In the embodiment, the fifth inserted portions 214a are close to the side surface of the support arms, laid out in relative positions of the two support arms 214. The sixth inserted portions 214a adjacent to the third inserted portion 230a are in the other side surface of the collecting plate 230, and are laid out relative to each other. In the present invention, the fifth inserted portion 214a is a groove, the sixth inserted portion 230c is the other side of the collecting plate.

Figure 4:
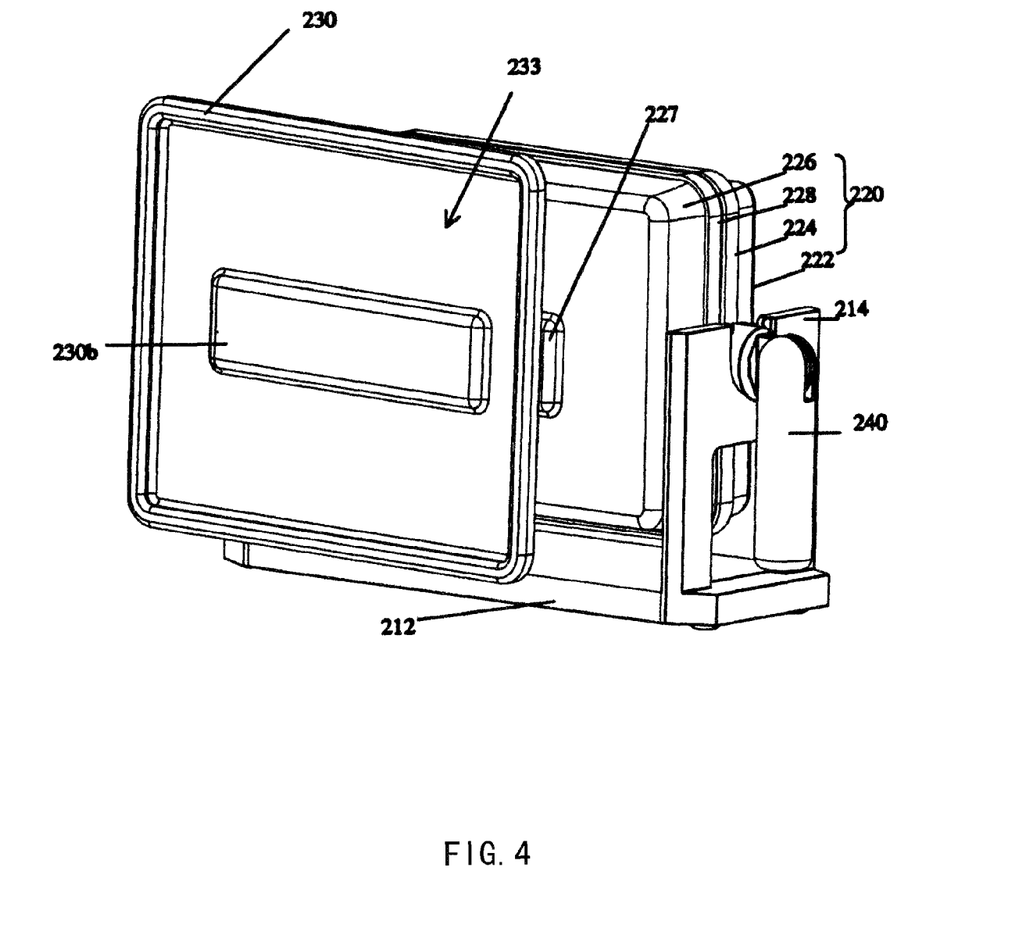
FIG. 4 is a three-dimension view of the collecting plate inserted in the main body in a embodiment of the present invention.

Referring to FIG. 4, in the embodiment, the collecting plate 230 is set up on the main body 220 which has a seventh inserted portion 227 connected with the forth inserted portion 230b of the collecting plate 230. So the normal line 231 of the collecting plate 230 is perpendicular to the normal line 213 of the pedestal 212. In the embodiment, the seventh inserted portion 227 is a protuberance which is in the middle of the lower shell 226 in the main body 220. The forth inserted portion 230b is a hollow which is in the middle of the bottom 233 of the collecting plate 230, but the present invention is not limited in the embodiment. The seventh inserted portion 227 could also be set up in other parts of the lower shell 226 or in the upper shell 226 in the main body 220, while the forth inserted portion 230b could also be set up in other parts of the bottom 233 of the collecting plate 230.

In conclusion, the structure feature of the muffin maker in the present invention is that two inserted devices having different functions are laid out between the support device and the collecting plate or between the main body and the collecting plate, and with these inserted devices, when the muffin maker is working, the collecting plate could be inserted in the pedestal in order to locate the collecting plate and increase the stability of the muffin maker; after the muffin maker completes its work, the collecting plate could be inserted in the support device or the main body, and the normal line of the collecting plate is perpendicular to the normal line of the upper shell in the main body. So the problem that the muffin maker takes up too much room when it is kept in storage is overcome.

From the description of preferred embodiments of the present invention, compared with conventional muffin makers, the advantage of the present invention is that under different conditions, the collecting plate is in different positions in order to achieve the effects of stabilizing the muffin maker, locating collecting plate and storage of the muffin maker. Besides, the present invention is simple and easy to volume-production, and the collecting plate is easy to be kept in storage. So the conventional problem of inconvenience of storing muffin maker is overcome.

All above are several preferable embodiments of the present invention, so the present invention should not be limited in these embodiments. In a word, it should be understood that according to the scope of the present invention and the content of the description, all the various equivalent modifications and alterations will be apparent in the scope and spirit of this invention. Therefore, the scope and sprit of the invention is limited only by the claims set forth herein as follows.

Industrial Applicability

The muffin maker of the present invention comprises a support device, a main body and a collecting plate. The support arms of the support device have a rotary device, and the pedestal of the support device has a first inserted portion. The present invention is simple and easy to volume-production, and when in use or in storage, the collecting plate is inserted in different positions of the pedestal, so the problem of the location and the storage of the collecting plate is overcome, and the invention has industrial applicability.

What is claimed is:

1. A waffle maker comprising:
 a support provided with a pedestal, at least one support arm provided with a rotary device, and a first inosculating portion;
 a main body connected to said rotary device;
 a collecting plate mounted on said support device and provided with a second inosculating portion used for connecting with said first inosculating portion when said main body is in a storage position,
 wherein the normal line of said collecting plate is perpendicular to the normal line of said pedestal when the collecting plate is in the storage position,
 wherein said first inosculating portion is a groove, and said second inosculating portion is an edge of said collecting plate.

2. The waffle maker according to claim 1, wherein said first inosculating portion is disposed in said at least one support arms.

3. The waffle maker according to claim 1, wherein said main body further comprises:
 an upper shell;
 a lower shell;
 an upper baking plate mounted on said upper shell;
 a lower baking plate mounted on said lower shell,
 wherein said upper baking plate and said lower baking plate can be separable from said upper shell and said lower shell; and
 a heating device, used for heating said upper baking plate and said lower baking plate.

4. The waffle maker according to claim 1, wherein the normal line of said collecting plate is horizontal and the normal line of said pedestal is vertical when the collecting plate is in the storage position.

5. A waffle maker comprising:
 a support provided with a pedestal and at least one support arm provided with a rotary device;
 a main body including a shell, the main body connected to said rotary device and provided with a first inosculating portion;
 a collecting plate mounted on said main body and provided with a second inosculating portion used for fitting with said first inosculating portion when said main body in storage,
 wherein the normal line of said collecting plate is perpendicular to the normal line of said pedestal when the collecting plate is in the storage position, and
 wherein said first inosculating portion is a protuberance disposed on the shell of said main body, and said second inosculating portion is an indentation disposed on the collecting plate.

6. The waffle maker according to claim 5, wherein said main body further comprises:
 an upper shell and
 a lower shell;
 an upper baking plate mounted on said upper shell; and
 a lower baking plate mounted on said lower shell, wherein said upper baking plate and said lower baking plate are separable from said upper shell and said lower shell; and
 a heating device, used for heating said upper baking plate and said lower baking plate.

7. The waffle maker according to claim 5, wherein the normal line of said collecting plate is horizontal and the normal line of said pedestal is vertical when the collecting plate is in the storage position.

* * * * *